Feb. 6, 1951  E. F. DE ROE  2,540,246
SAFETY CUTOUT SWITCH
Filed July 29, 1949  2 Sheets-Sheet 1
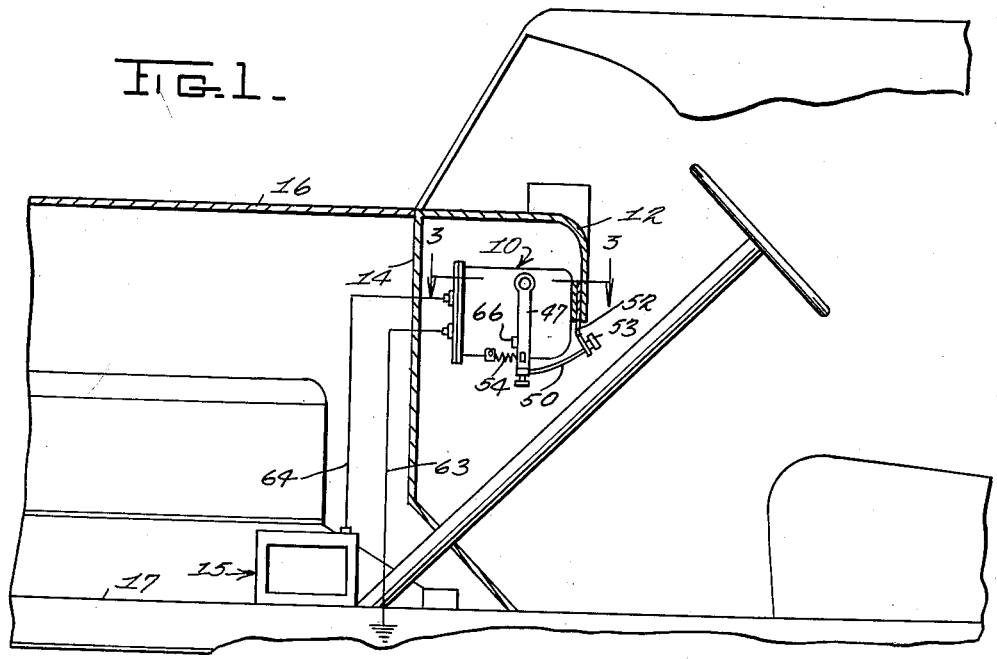
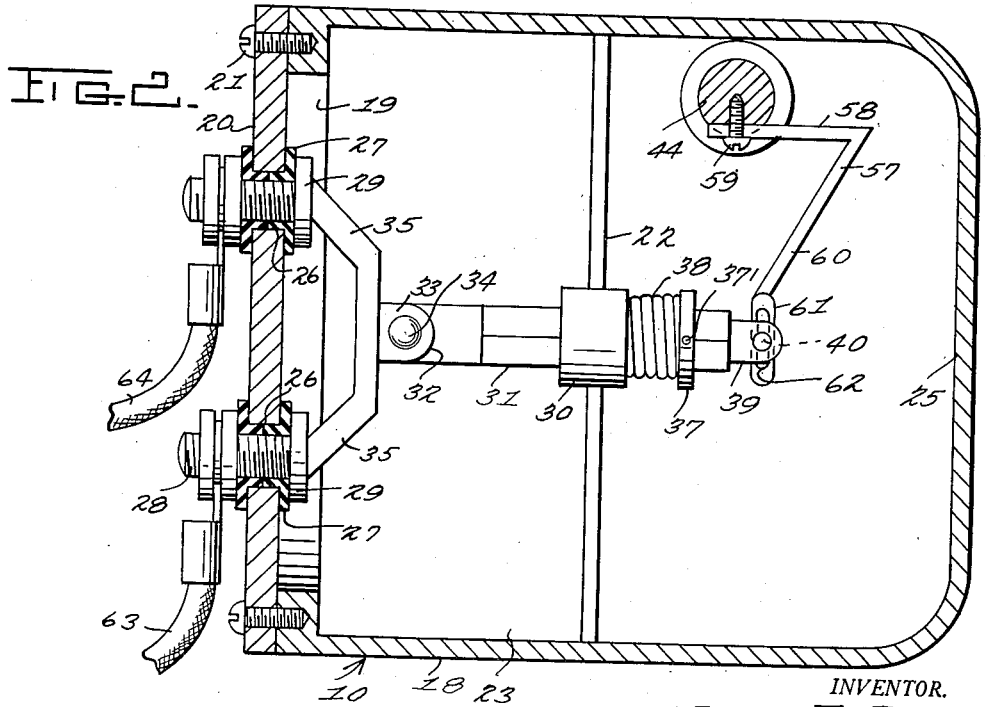
INVENTOR.
Edward F. De Roe
BY
McMorrow, Berman & Davidson
ATTORNEYS Feb. 6, 1951 E. F. DE ROE 2,540,246
SAFETY CUTOUT SWITCH
Filed July 29, 1949 2 Sheets-Sheet 2
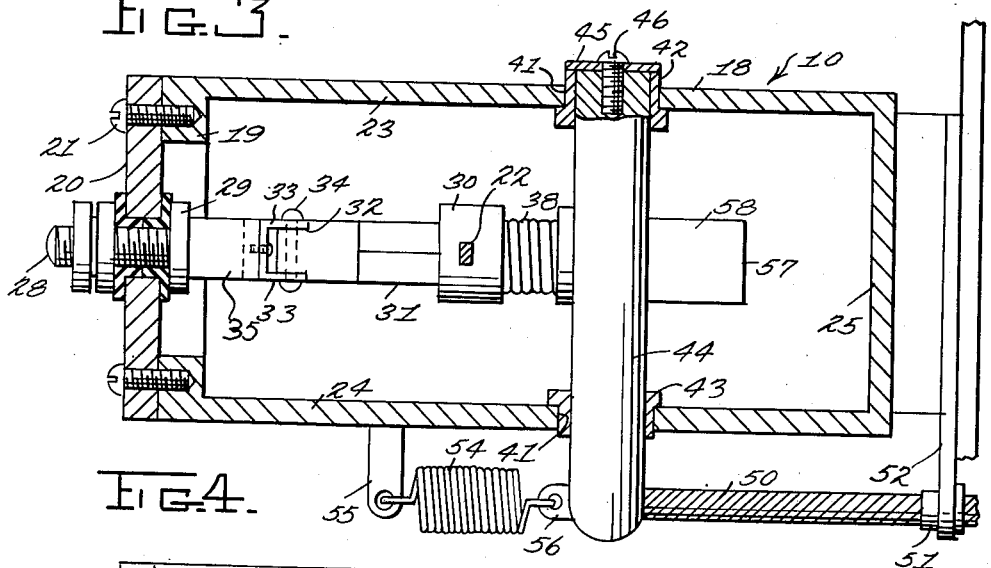
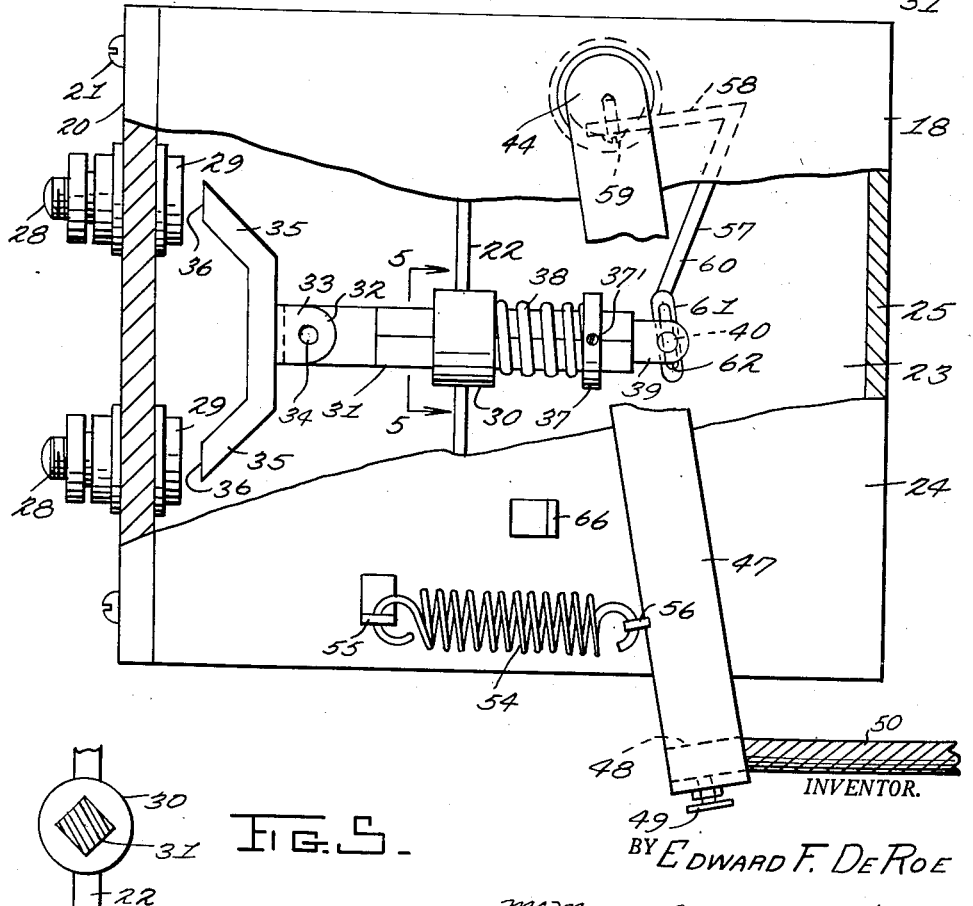
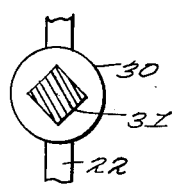
INVENTOR.
BY *Edward F. De Roe*
*McMorrow, Berman & Davidson*
ATTORNEYS Patented Feb. 6, 1951

2,540,246

UNITED STATES PATENT OFFICE 2,540,246

SAFETY CUTOUT SWITCH

Edward F. De Roe, Perryville, Mo.

Application July 29, 1949, Serial No. 107,551

2 Claims. (Cl. 200—163)

This invention relates to an improved safety cut-out switch especially, but not exclusively, for use with automotive ignition systems, and enabling quickly and easily breaking the battery-to-ground connection of the battery in an emergency, or whenever desired in normal operation of the automobile, in order to prevent damage to the circuit or fire hazard, the primary object of the invention being to provide a more efficient and reliable switch of this kind involving novel construction and relative arrangement of components whereby the action of the switch is rendered more positive and is less reliant upon proper manipulation by an operator to achieve its fully-open and fully-closed positions.

Another important object of the invention is the provision of a switch of the above-indicated character wherein the component parts are easily assembled and are of simple form and can be manufactured in a rugged and serviceable form at relatively low cost.

Other important objects and advantageous features of the invention will be apparent from the following description and accompanying drawings, wherein, for present purposes of illustration only, a specific embodiment of the invention is set forth in detail.

In the drawings:

Figure 1 is a general schematic view showing the switch installed in relation to an automobile and its battery;

Figure 2 is an enlarged vertical longitudinal section taken through the switch per se, and showing the switch in closed position;

Figure 3 is a horizontal section taken through the upper part of Figure 2;

Figure 4 is a side elevation of the switch, partly broken away, to show the disposition of parts in the open position of the switch;

Figure 5 is a fragmentary vertical transverse section, taken on the line 5—5 of Figure 4.

Referring in detail to the drawings, and first to Figure 1 thereof, the numeral 10 generally designates the illustrated switch, shown mounted on and beneath the instrument panel 12, to the rear of the dashboard or fire wall 14 and connected to the battery 15 located in the motor compartment 16 and to the chassis frame 17.

The switch 10 comprises a preferably metal rectangular casing 18 of relatively narrow width having its forward end open and provided with an inwardly-projecting flange 19 and a removable closure plate 20 secured in place by screws 21 engaged in the flange 19. The casing includes the side wall 23 and the opposite side wall 24 and the rear end 25. Access for repair, adjustment or assembly of the rear operating parts of the switch may be provided for by forming suitable holes in the top or side of the casing 18, normally closed by cover plates.

The cover plate 20 is provided with a pair of vertically-spaced holes 26, 26 in which are seated flanged insulated bushings 27, 27, traversed by binding post contacts 28, 28 involving contact points 29, 29 on their rearward ends exposed at the rearward side of the cover plate 20.

On a web 22 extending between the top and bottom of the casing is fixed an insulated slide shaft bushing 30 through which a squared shaft 31 is slidably mounted. The forward end of the shaft is reduced at 32 to seat the furcations 33, 33, with a pivot pin 34 passing therethrough, the furcations projecting rearwardly from the middle of a contactor having divergent arms 35, 35 with their flattened terminals 36, 36 positioned to engage the contact points 29, 29 when the shaft 31 is in the extreme left-hand or closed position.

Circumposed on the shaft 31 and compressed between the bushing 30 and a collar 37 secured in place by a set screw 37' is a helical spring 38. The rearward end of the shaft 31 terminates in a lug 39 having a lateral pivot pin 40.

The casing side walls 23 and 24 have transversely-aligned openings 41, 41 positioned above the rear end of the slide shaft 31, accommodating insulated journal bushings 42 and 43, respectively, in which is journaled the transverse rock shaft 44. A thrust washer 45 is secured by a screw 46 to one end of the shaft 44 and bears against the outer end of the bushing 42, as shown in Figure 3. The opposite end of the shaft 44 has a depending lever part 47 outside of the casing, having a bore 48 at its lower end and a set screw 49, whereby a flexible cable or wire 50 can be detachably secured thereto, with the cable 50 passing through an eye 51 on a bracket 52 utilized for securing the casing to the instrument panel 12 or other support. The cable terminates in a push-pull knob 53. A contractile helical spring 54 is stretched between an eye 55 on the casing side wall 24 and an eye 56 on the rock shaft lever part 47, whereby the lever part is normally in a forwardly-swung position corresponding to a positively closed position of the switch.

Operating connection between the rock shaft 44 and the slide shaft 31 takes the form of an arm 57 in the general form of a numeral 7 involving the portion 58 secured tangentially to the under side of the rock shaft 44 by a stud 59, and an acutely-angulated portion 60 terminating in an extension 61 formed with a slot 62 extending at right angles to the portion 58. The slot 62 engages the lateral pin 40 on the rear end of the slide shaft 31.

Normally the spring 38 retracts the contactor out of engagement with the contact points. The pivotal connection of the contactor with the slide shaft 31 permits the contact arm terminals 36, 36 to achieve equalized engagement with the contact points, in the closed position of the switch, shown in Figure 2. The lower binding post 28 is connected by a suitable cable 63 to the chassis 17 or other suitable grounded part of the automobile, and the upper binding post 28 is connected by a cable 64 to the ground post 65 of the battery 15, so that in the closed position of the switch the battery 15 is effectively connected to ground.

When desired, as in the case of an accident or a short circuit, the knob 53 is adapted to be pulled out by the driver of the automobile, thereby pulling the rock shaft lever 47 rearwardly against the pull of the spring 54 and moving the rock shaft arm 57 rearwardly so as to permit the spring 38 to expand and force the slide shaft 31 rearwardly and withdraw the contactor arm terminals 36 out of engagement with the contacts 29, 29 and thereby break the ground connection of the battery 15.

It will be observed that the spring 38 normally tends to retract the slide shaft 31 and withdraw the contactor from the contacts 29, 29, but that this action is overcome when the button 53 is in a pushed-in position. The spring 54, acting through the rock shaft lever 47 and the rock shaft arm 57 and its pin and slot connection with the slide shaft 31 holds the shaft 57 in an over-center, forward position. It will also be observed that the spring 38 serves to cushion the engagement of the contactor with the contacts 29, 29 as the rock shaft lever 47 is swung forwardly toward the over-center position, in which it is stopped by the lug 66 on the side of the casing in the closing of the switch, and to yieldably maintain such engagement until the button 53 is pulled out. When the button is pulled out the spring 38 is released to retract the contactor quickly and cleanly from engagement with the contacts 29, 29 in a manner to reduce or eliminate swing.

I claim:

1. In a safety cut-out switch, a support, a pair of laterally spaced insulated contacts on said support, a slide shaft mounted on said support for endwise movement toward and away from said contacts. said slide shaft having a contactor on the end thereof adjacent to the contacts, a first spring compressed between a portion of said support and a portion on said slide shaft and biasing said slide shaft in a direction away from the contacts, a rock shaft mounted on said support at a side of said slide shaft with its axis at right angles to the axis of the slide shaft, an arm fixed on said rock shaft having a free end extension formed with a slot extending therealong, a pin on said slide shaft engaged in said slot, a lever fixed on said rock shaft arranged to be swung in a direction toward the contacts so as to force said slide shaft in the same direction to engage the contactor with the contacts, a second spring biasing said lever in the same direction whereby the contactor is maintained in contact with the contacts until said lever is swung far enough in the opposite direction against the resistance of said first spring to permit said slide shaft to be moved in a direction away from the contacts by expansion of said first spring so as to disengage said contactor with the contacts.

2. In an electric switch, a support having at one end a pair of insulated contacts, a contactor for engaging and bridging said contacts, a slide shaft having said contactor thereon and being mounted on said support for endwise movement from a starting position toward said one end of the support, a first spring biasing said slide shaft toward its starting position in a direction away from said contacts, a rock shaft mounted on said support and extending across said slide shaft, an arm fixed to project from said rock shaft laterally with respect to the axis of the slide shaft, said arm having a slot in its outer end extending longitudinally of said arm and crosswise of the axis of said slide shaft, a pin on the slide shaft engaged in said slot, a lever fixed to said rock shaft and projecting laterally with respect to the axis of the rockshaft, said lever being swingable in a direction toward said contacts so as to force said arm in the same direction so as to force said rock shaft in the same direction away from its starting position to a final position in which said contactor is engaged with said contacts and said first spring is compressed, the outer end of said arm thereby assuming an over center position at one side of said rockshaft in which the engagement of said pin in said slot retains the slide shaft in its final position, and a second spring yieldably biasing said lever toward the over center position whereby the slide shaft is maintained in its final position, said lever being arranged to be swung in the opposite direction against the resistance of said second spring so as to move said arm to an over center position at the opposite side of the rockshaft wherein said first spring is free to expand and move said slide shaft in a direction to disengage the contactor from the contacts.

EDWARD F. DE ROE.

REFERENCES CITED

The following references are of record in the file of this patent:

UNITED STATES PATENTS

| Number | Name | Date |
|---|---|---|
| 1,401,652 | Scully | Dec. 27, 1921 |
| 1,431,678 | Mooers et al. | Oct. 10, 1922 |
| 1,552,271 | Burnham | Sept. 1, 1925 |
| 1,796,612 | Nagl | Mar. 17, 1931 |
| 2,150,566 | Scott, Jr. | Mar. 14, 1939 |
| 2,290,516 | Willmann | July 21, 1942 |